Aug. 23, 1955 G. P. FULTON ET AL 2,715,833
APPARATUS FOR MEASURING THE RELATIVE
HUMIDITY WITHIN AN AQUEOUS LIQUID
Filed Aug. 13, 1952

INVENTORS
**GEORGE P. FULTON
JAMES C. ALEXANDER**

BY
*Semmes, Keegin, Robinson & Semmes*
ATTORNEYS

United States Patent Office 2,715,833
Patented Aug. 23, 1955

2,715,833

APPARATUS FOR MEASURING THE RELATIVE HUMIDITY WITHIN AN AQUEOUS LIQUID

George P. Fulton, Silver Spring, and James C. Alexander, Fairland, Md., assignors to National Institute of Cleaning & Dyeing, Silver Spring, Md., a corporation of Missouri Application August 13, 1952, Serial No. 304,055

4 Claims. (Cl. 73—73)

This invention relates to apparatus for measuring the relative humidity within an aqueous liquid other than pure water, and relates more particularly to a method of and apparatus for measuring and ascertaining the relative humidities within aqueous liquids in which the relative humidity within the liquid is critical to or has an effect on the utility or action of the liquid when put to a a certain use, such, for instance, as dry cleaning solvents when used for the dry cleaning of fabrics; it being understood, however, that the invention is applicable to all aqueous liquids.

The expression "relative humidity within an aqueous liquid" is defined as follows:

$$\frac{\text{Vapor pressure of water in the subject liquid}}{\text{Vapor pressure of pure water at the same temperature as that of the subject liquid}} \times 100$$

The method and apparatus of this invention and the utility thereof have been disclosed in our pending application Serial No. 299,378, filed July 16, 1952, on a method of dry cleaning, and in our pending application Serial No. 304,286 filed August 14, 1952, on a system of dry cleaning, but is not claimed in said applications apart from a dry cleaning method or a dry cleaning system.

It is pointed out in said pending applications that in the dry cleaning of fabrics the degree or value (commonly measured in percent) of the relative humidity (a function of the vapor pressure of water) within the solvent has a very considerable influence on the efficacy of the solvent in removing various types of soil and stains, and with respect to shrinkage, wrinkling, color retention and damage to sizing and finish and that for best all around results the relative humidity within the solvent should be established and maintained at from 60% to 85%. It is also pointed out that the relative humidity within a liquid may be raised by increasing the water content of the liquid and reduced by reducing the water content of the liquid. Obviously to practice the inventions of said pending applications it is necessary to measure and to ascertain the relative humidity of the solvent. Said pending applications also disclose a method and a system for dry cleaning whereby the relative humidity within the solvent is controlled automatically to establish and to maintain the relative humidity within the solvent at any predetermined and pre-selected value. The present invention, however, is not restricted to the art of dry cleaning, but is of broader application.

Accordingly a broad object of this invention is to provide a method and apparatus whereby the relative humidity within a liquid may be ascertained with a high degree of accuracy.

Another object of this invention is to provide a method of and apparatus for actuating control mechanism in response to changes in the value of the relative humidity within a liquid.

Another object of this invention is to provide a method of the character stated and which is simple and easy to carry out and which is reliable in its results and yields the results clearly and promptly.

A further object of this invention is to provide an apparatus of the character stated and which apparatus is simple in construction and reliable and effective in operation.

Other objects of this invention will be in part obvious and in part pointed out hereinafter.

The invention, accordingly, consists in the method and the steps thereof and in the apparatus and the elements, combinations of parts and features of construction thereof which will be described more fully hereinafter and the scope of the application of which will be pointed out in the claims that follows.

In accordance with this invention the method of ascertaining the relative humidity within an aqueous liquid includes causing air to acquire the same relative humidity and the same temperature as the relative humidity within and the temperature of the subject liquid and then submitting the air so conditioned to a sensing element of a hygrometer which will register the relative humidity of said air and consequently the equal relative humidity within the subject liquid and thus the relative humidity within the subject liquid is ascertained. By this method not only the relative humidity within the subject liquid may be ascertained but by connecting the hygrometer to a responsive control mechanism, for instance for opening and closing a valve, the method may be extended to actuating a control mechanism in accordance with changes in the relative humidity within the subject liquid.

As to the apparatus, the apparatus includes a chamber adapted to contain the subject liquid, means for placing air into intimate contact with the subject liquid until the air acquires the same relative humidity as that within the subject liquid, means for causing the air to acquire the same temperature as that of the subject liquid and means for submitting the air so conditioned to a sensing element of a hygrometer; the relative humidity of said air and the equal relative humidity within the subject liquid being ascertainable from the hygrometer. If desired, control mechanism actuatable by said hygrometer may be provided to operate a valve or any other instrumentality as desired in response to changes in the value of the relative humidity within the solvent and to which relative humidity the air submitted to the hygrometer has been conditioned.

In order that a clear understanding of this invention may be had attention is hereby directed to the accompanying drawings forming a part of this application and illustrating one possible embodiment of this invention and in which.

Similar reference characters refer to similar parts in both views of the drawings.

Figure 1:
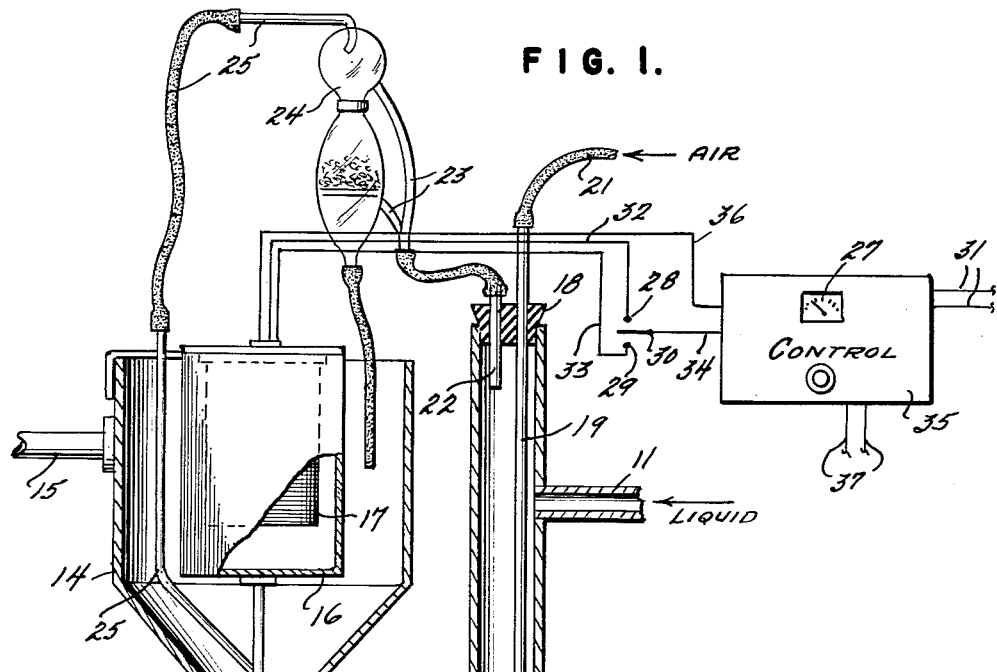
Figure 1 is a schematic view of an apparatus embodying this invention.
Figure 2:
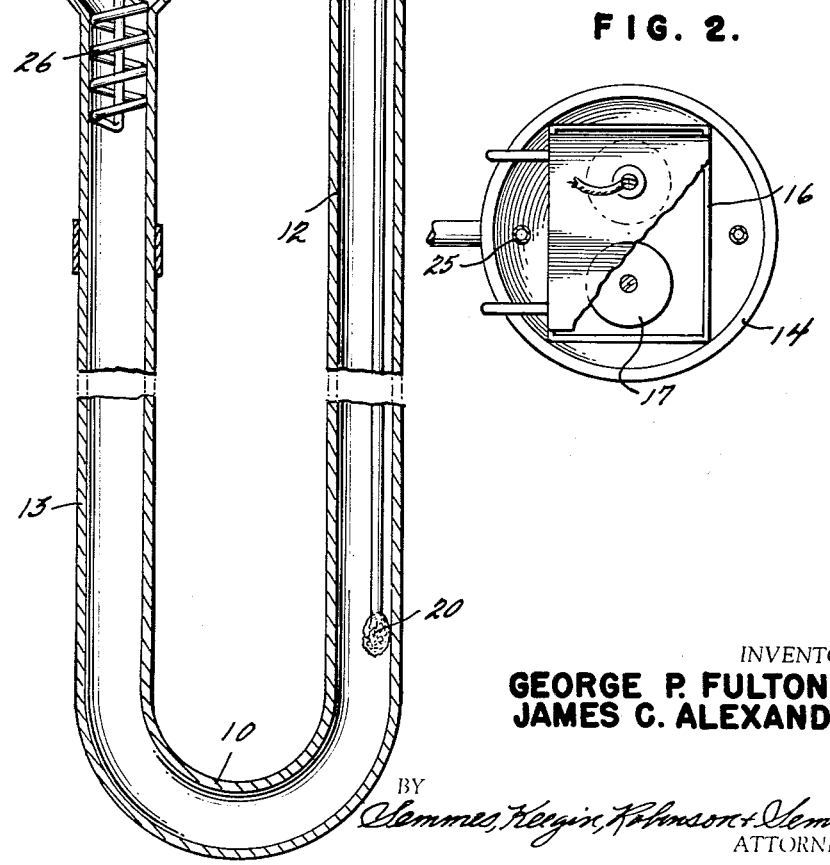
Figure 2 is a plan view of the hygrometer sensing element box disposed in a chamber of the apparatus, a portion of the top of the box being shown broken away.

Referring to the drawings the apparatus has an air conditioning chamber 10 which may be in the form of a U-tube. The subject liquid of which the relative humidity within it is desired to be measured and ascertained may be introduced into the chamber through an inlet pipe 11 which enters one of the legs 12 of the U-tube near its top. The upper end of the other leg 13 of the U-tube is enlarged and forms a bowl 14 from which extends an overflow pipe 15. Supported in this bowl 14 so as to have its top slightly above the overflow 15 is a metal box or case 16 in which are disposed two humidity sensitive elements 17 of a hygrometer. When the relative humidity of a liquid is desired to be ascertained a continuous flow of liquid preferably is introduced through the inlet pipe 11 and overflows through the overflow outlet 15. However, the circulation of the liquid through the U-tube is not necessary so long as the U-tube is filled with the liquid substantially up to the overflow level 15.

In accordance with this invention the relative humidity within the liquid in the tube is ascertained by conditioning air to have the same percent of relative humidity as the percent of relative humidity within the liquid by placing the air into intimate contact with the liquid, and conditioning the air also to have the same temperature as that of the liquid by placing the air in heat exchange relation with the liquid, and then ascertaining the percent of the relative humidity of the air thus conditioned and which percent of relative humidity will be the same as the percent of relative humidity within the liquid.

To this end the top of the leg 12 of the U-tube is provided with a stopper 18 through which extends a tube 19 which reaches well down toward the bottom of the U-tube and at its lower end is provided with a fritted portion 20, and at its upper end is connected with a conduit 21 which leads from a source of compressed air. Also extending through the stopper 18 is a short tube 22 the lower end of which is about the liquid level of the U-tube so that when compressed air discharging through the fritted end 20 of the tube 19 bubbles up through the liquid in the U-tube the tube 22 will catch and entrap the air that bubbles up through the liquid. The upper end of tube 22 is connected by tubing 23 to a foam trap 24 and from this foam trap 24 tubing 25 extends down into the bowl 14 to the bottom thereof and then into the box or casing 16. Where the tubing is at the bottom of the bowl 14 it has a spiral formation 26 which constitutes a heat exchanger between the air flowing through the tube and the liquid in the chamber 10. The sensing elements 17 of the hygrometer have the conventional connections with a hygrometer dial 27 and which registers the relative humidity of the conditioned air submitted to sensing elements 17 of the hygrometer, and since the percent of relative humidity of the air registered on the dial 27 is the same as the percent of the relative humidity of the liquid in the chamber 10, this dial reading gives the percent of the relative humidity within the liquid in the chamber 10.

The hygrometer may include only a single sensing element, but two are preferred responding to different ranges of humidities because thereby a wider range of relative humidities within the liquid in the chamber 10 may be ascertained.

If desired the hygrometer may be connected to a conventional hygrometer responsive control, and to this end an Aminco electric hygrometer controller (Cat. #4–4924) may be employed. With two sensing elements an alternate contact switch having contacts 28 and 29 and switch arm 30 may be employed for connecting either one of the sensing elements 17 of the hygrometer to the control as selected. As shown, the control receives power from the line 31. A conductor 32 from one of the sensing elements 17 leads to the switch contact 28 and a conductor 33 leads from the other sensing element 17 to the switch terminal 29, and a conductor 34 leads from the switch arm 30 into the control 35. Other conductors 36 lead from the other terminals of the sensing elements 17 into the control. This control may be of conventional type and may have controlling leads 37 for connection to any suitable mechanism to be controlled, such, for instance, as a solenoid valve in a flow line, and which is the control shown in our said pending applications.

It is believed that the construction and assembly of the apparatus of this invention, and also the method of ascertaining the relative humidity within a liquid by means of this apparatus or by other means is clear and has been fully described and repetition is believed to be unnecessary. However, since many different modifications of the method may be made and many different changes and modifications in the structure of the apparatus may be made without departing from the scope of this invention, it is understood that all matter contained in the above description or shown in the accompanying drawings be interpreted as illustrative and not in a limiting sense.

Where the term "aqueous" is used herein it is to be understood that this device and method is applicable in systems where water may be the solute (the substance dissolved). There are many applications in dry cleaning where the amount of water in the solvent may be as low as 0.03%–0.05%.

What is claimed is:

1. Apparatus for ascertaining the relative humidity within a liquid, including, in combination, a chamber adapted to contain the subject liquid, a hygrometer having a sensing element, air conducting means associated with the chamber and adapted to place air into intimate contact with subject liquid in said chamber until said air acquires the same relative humidity as the relative humidity within subject liquid in said chamber, heat exchange means adapted to bring said air to the same temperature as the temperature of the subject liquid in said chamber and means adapted to submit said air while having the same relative humidity as the relative humidity within said subject liquid and the same temperature as that of said subject liquid to the said sensing element of said hygrometer whereby the relative humidity of said air and consequently the equal relative humidity within the subject liquid is ascertained, said chamber being a vertical U-tube having a liquid inlet into one leg below its top and having overflow outlet from the outer leg establishing the liquid level of the chamber, the upper end of the U-tube leg which has the overflow outlet being enlarged and forming a bowl and said overflow outlet being in the side of the bowl intermediate its top and bottom, a case in said bowl whereby the case acquires the same temperature as that of the liquid in said bowl and said sensing element of the hygrometer being contained in said case and said means being adapted to submit the conditioned air to the sensing element of the hygrometer including an air conduit leading said air into the case.

2. Apparatus as set forth in claim 1 and in which said U-tube leg which has the liquid inlet has an air space above the liquid level thereof and said means adapted to submit conditioned air to the sensing element of the hygrometer includes an air conduit leading from said space into said case in which the sensing element of the hygrometer is contained.

3. Apparatus as set forth in claim 2 and which includes a foam and bubble trap in said air conduit intermediate said space and said case.

4. Apparatus as set forth in claim 2 and which includes a heat-exchanger formed in said air conduit and disposed at the bottom of said bowl below the liquid level thereof and adapted to pass air in heat exchange relation with the liquid in said bowl whereby said air acquires the same temperature as the temperature of the liquid in the bowl, and said air conduit leads from said heat exchanger into the case which contains the sensing element of the hygrometer.

References Cited in the file of this patent

UNITED STATES PATENTS

| | | |
|---|---|---|
| 1,646,516 | Witham | Oct. 25, 1927 |
| 1,690,155 | Amdursky | Nov. 6, 1928 |
| 2,002,101 | Valby et al. | May 21, 1935 |
| 2,377,363 | Noble et al. | June 5, 1945 |
| 2,400,427 | Mabey | May 14, 1946 |

OTHER REFERENCES

"Physics Text—Hausmann and Slack. Published by Van Nostrand Company, New York, September 1935, pp. 337–338.